United States Patent [19]
Mita et al.

[11] Patent Number: 5,684,352
[45] Date of Patent: Nov. 4, 1997

[54] PERMANENT MAGNET FIELD-TYPE ROTATING MACHINE

[75] Inventors: Masahiro Mita; Takashi Sasaki, both of Fukaya, Japan

[73] Assignee: Hitachi Metals, Ltd., Tokyo, Japan

[21] Appl. No.: 620,845

[22] Filed: Mar. 20, 1996

[30] Foreign Application Priority Data

Mar. 24, 1995 [JP] Japan ................................. 7-065518
Mar. 6, 1996 [JP] Japan ................................. 8-048969

[51] Int. Cl.$^6$ ................................................ H02K 21/12
[52] U.S. Cl. ........................... 310/156; 310/152; 310/261
[58] Field of Search ............................... 310/152, 153, 310/155, 156, 157, 261, 262; 360/99.08, 98.07, 99.04, 97.02

[56] References Cited

U.S. PATENT DOCUMENTS 5,371,426 12/1994 Nagate et al. ........................ 310/156
5,488,260 1/1996 Heyraud ............................. 310/156
5,508,576 4/1996 Nagate et al. ........................ 310/156

FOREIGN PATENT DOCUMENTS 6-245418 9/1994 Japan.
7-163073 6/1995 Japan.

*Primary Examiner*—Clayton E. Laballe
*Assistant Examiner*—Timothy A. Williams
*Attorney, Agent, or Firm*—Finnegan, Henderson, Farabow, Garrett & Dunner

[57] ABSTRACT

Disclosed is a permanent magnet field-type rotating machine of a high efficiency having an internal magnet-type rotor. The rotating machine comprises an internal magnet-type rotor having a plurality of permanent magnets embedded in a rotor yoke, and a stator disposed in opposed, spaced relationship to the rotor, with an air gap formed between the rotor and the stator. The rotor yoke comprises a member in which ferromagnetic regions and non-magnetic regions coexist, and the non-magnetic regions are disposed respectively at those positions of the rotor yoke where leakage magnetic flux is liable to be generated.

20 Claims, 9 Drawing Sheets

F I G. 12
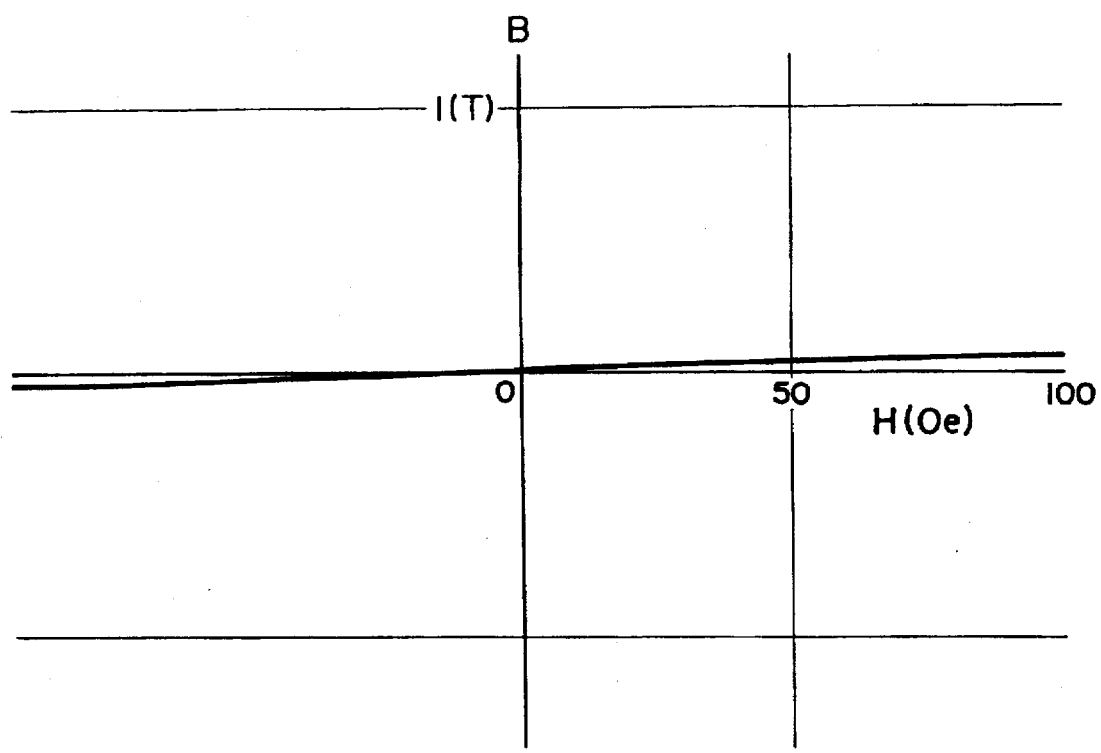

PERMANENT MAGNET FIELD-TYPE ROTATING MACHINE

BACKGROUND OF THE INVENTION

This invention relates to a permanent magnet field-type rotating machine such as a motor and a generator (dynamo).

Permanent magnet field-type rotating machines, which use permanent magnets as field-generating means, and do not need to be supplied with field energy from the exterior, achieve a higher efficiency than winding field-type rotating machines, and therefore because of their energy-saving nature, such permanent magnet field-type rotating machines have been extensively used in a small-size motor, a servo motor for a robot, a generator, and so on.

Permanent magnet field-type rotating machines are generally classified into the following two kinds in accordance with the arrangement of permanent magnets.

In one kind of permanent magnet arrangement shown in FIG. 13 (which is a cross-sectional view of an essential portion), permanent magnets 1 is mounted on a surface of a rotor 10 so as to be directly confronted with an air gap 4 between the rotor 10 and a stator 20. This type of magnetic circuit is commonly referred to as "surface magnet-type magnetic circuit". In the surface magnet-type magnetic circuit shown in FIG. 13, magnetic flux $A_1$, coming out of the north pole of the permanent magnet 1a, passes through the air gap 4 to reach a stator yoke portion 3a, as indicated by arrows. The flux $A_1$ passes through stator yoke portions 3b and 3c, and again passes through the air gap 4, and further returns to the south pole of the permanent magnet 1a via the permanent magnet 1b and a rotor yoke 2, thus forming a closed loop. In FIG. 13, $t_{30}$ indicates the minimum distance of the air gap 4.

The other type of permanent magnet arrangement is called "an internal magnet-type magnetic circuit", and FIG. 15 is a cross-sectional view of an essential portion of this arrangement. In FIG. 15, permanent magnets 1 are embedded in a rotor yoke 2, and magnetic flux $A_2$, coming out of the north pole of the permanent magnet 1, passes through an air gap 4 between a stator 20 and a rotor 10 via the rotor yoke 2, as indicated by an arrow. The flux $A_2$ sequentially passes through stator yoke portions 3a, 3b and 3c, and again passes through the air gap 4, and then returns to the south pole of the permanent magnet 1 via the rotor yoke 2, thus forming a closed loop. In FIG. 15, $t_{40}$ indicates the minimum distance of the air gap 4.

The rotating machine, having the rotor of a surface magnet-type magnetic circuit construction, has an advantage that since one magnetic pole of each permanent magnet is directly confronted with the air gap, the magnetic fluxes, produced respectively by the permanent magnets, can be utilized efficiently. When the distance of the air gap is sufficiently smaller as compared with the interval between the adjacent permanent magnets, most of the magnetic fluxes, produced by the permanent magnets, reach the stator yoke.

However, conventional known permanent magnet materials for practical use, such as the ferrite-type and the rare earth element type, do not have a sufficient mechanical strength, and during the operation of the rotating machine having the rotor of a surface magnet-type magnetic circuit construction, the permanent magnets, mounted on the rotor, are often cracked or chipped by a centrifugal force acting on the rotor, resulting in that a fragment or broken piece of the permanent magnet is caught in the air gap, thereby causing a malfunction of the rotating machine.

In the rotating machine with the rotor of a surface magnet-type magnetic circuit construction, where the permanent magnets are adhesively bonded to the surface of the rotor yoke, the bonding strength is often not so high against the centrifugal force produced by the high speed rotation of the rotor, and during the operation of the rotating machine, the permanent magnets may be separated from the rotor yoke under the influence of the centrifugal force acting on the rotor, thereby causing a malfunction of the rotating machine.

In the rotating machine with the rotor of a surface magnet-type magnetic circuit construction, the permanent magnets are arranged on the surface of the rotor, thus keeping a dimensional tolerance (irregularity) of adhesive bonding between the rotor yoke and the permanent magnets, a dimensional tolerance of working of the permanent magnets (which have a poor workability) and so on all responsible for a final dimensional precision at the outer periphery of the rotor with respect to rotation deflection of the rotor. Therefore, in view of the amount of eccentricity of the rotor during the rotation thereof, it is necessary to increase the distance of the air gap between the rotor and the stator, so that the overall magnetic resistance of the magnetic circuit increases to thereby reduce the density of the effective magnetic flux contributing to the efficiency of the rotating machine and the power-generating efficiency.

In order to overcome the defects regarding to the mechanical strength, such as separation (peeling), chipping and cracking of permanent magnets in the rotor of a rotating machine with a surface magnet-type magnetic circuit construction, it has been proposed to wind a carbon fiber material or a thin rotor can 8 around permanent magnets 1 as shown in FIG. 14 (which is a cross-sectional view of an essential portion), the rotor can 8 being made of a titanium alloy, stainless steel or silicon steel. The rotor can 8 increases the strength of fixing of the permanent magnets 1 to a rotor yoke 2, prevents stress concentration on the permanent magnets 1, and prevents fragments of the permanent magnets from jumping into an air gap (not shown) if the permanent magnet 1 is separated from the rotor yoke 2, or cracked or chipped for some reason.

However, such provision of the rotor can 8 increases the cost, and besides if the rotor can 8 is made of a non-magnetic material such as a titanium alloy, the magnetic distance of the air gap (not shown) between the rotor 10 and the stator must be increased by an amount corresponding to the thickness of the rotor can 8, which leads to a drawback that the overall magnetic resistance of a magnetic circuit increases, so that the amount of effective magnetic fluxe passing through the air gap is reduced.

On the other hand, if the rotor can 8 is made of a ferromagnetic material, the magnetic flux passes through the rotor can 8, so that a short-circuiting flux, called a leakage flux, flows between the adjacent magnetic poles provided on the outer periphery of the rotor 10. This results in a drawback that the amount of effective magnetic flux interlinking windings at the stator is greatly reduced.

For mounting the rotor can 8 on the rotor 10, the inner peripheral surface of the rotor can 8 is fixed in intimate contact with the outer surfaces of the permanent magnets 1 by shrinkage fitting or the like in order to reduce a gap between each permanent magnet 1 and the rotor can 8 as much as possible. Even with the use of the rotor can 8, the final dimensional precision regarding rotation deflection of the rotor are at a level equal to or greater than that obtained by the construction in which the permanent magnets 1 are exposed at the surface of the rotor 10, and therefore it is difficult to reduce the distance of the air gap (not shown) between the rotor 10 and the stator.

On the other hand, in the rotating machine with the internal magnet-type rotor, most of the above drawbacks of the rotating machine with the surface magnet-type rotor are overcome. More specifically, the rotating machine with the internal magnet-type rotor has an advantage that since the permanent magnets are firmly fixed in the rotor yoke, a malfunction due to the separation, cracking and chipping of the permanent magnets hardly occurs as compared with the rotating machine with the surface magnet-type rotor.

Furthermore, the peripheral portion of the rotor, and particularly the outer peripheral portion of the rotor, are formed entirely by the rotor yoke, and therefore the dimensional tolerance of the outer peripheral portion of the rotor is determined only by the dimensional tolerance of working of the rotor yoke, so that the rotor of a high dimensional precision can be obtained. Therefore, the distance of the air gap between the rotor and the stator can be greatly reduced as compared with the rotating machine with the surface magnet-type rotor. As a result, the overall magnetic resistance can be reduced, so that the amount of effective magnetic flux to reach the stator can be greatly increased.

However, in the rotating machine with the internal magnet-type rotor as typically shown in FIG. 15, magnetic flux $B_2$, coming out of the north pole of the permanent magnet 1, return to the south pole of the same permanent magnet 1 via the rotor yoke 2 as indicated by arrows, thereby forming short-circuiting paths, and the so-called leakage fluxes $B_2$ are thus produced. Therefore, there is encountered a drawback that the flux produced by the permanent magnet 1 can not be efficiently used as the effective magnetic flux $A_2$ interlinking windings 7 at the stator 20.

In order to reduce these leakage fluxes as much as possible, there has been proposed a method in which a thickness $t_1$ of those portions of the rotor yoke 2 each constituting part of a path of passage of leakage magnetic flux $B_3$, as well as a thickness $t_2$ of those portions of the rotor yoke 2 each constituting part of a path of passage of leakage magnetic flux $B_4$, is reduced to thereby increase the magnetic resistance at these portions $t_1$ and $t_2$, thereby reducing the leakage magnetic flux $B_3$ and $B_4$ while increasing only the effective magnetic flux $A_3$, as shown in FIG. 16 (which is a cross-sectional view of an essential portion). With this method, the leakage magnetic flux can be reduced to a level acceptable for practical use. However, the rotor yoke 2 has the very thin portions $t_1$ and $t_2$, and this invites a problem that the reliability of the rotating machine rotor with respect to the mechanical strength and durability is lowered.

SUMMARY OF THE INVENTION

With the above problems in view, it is an object of this invention to provide a permanent magnet field-type rotating machine of a high efficiency having an internal magnet-type rotor which is simple in construction, can be easily assembled, and has a high durability, and has such a magnetic circuit construction in which a leakage flux is very few.

According to a first aspect of the present invention, there is provided a permanent magnet field-type rotating machine comprising:

an internal magnet-type rotor having a plurality of permanent magnets embedded in a rotor yoke; and a stator disposed in opposed, spaced relationship to the rotor, with an air gap formed between the rotor and the stator;

wherein the rotor yoke comprises a member in which ferromagnetic regions and non-magnetic regions coexist, and the non-magnetic regions are arranged respectively at those positions of the rotor yoke where leakage magnetic flux is liable to be generated.

The followings are preferable variances of the above features.

The member, in which the ferromagnetic regions and the non-magnetic regions coexist, is formed of a single material comprising the ferromagnetic regions and the non-magnetic regions in which the both groups are different from each other in crystal structure.

The member, in which the ferromagnetic regions and the non-magnetic regions coexist, is of an integral construction.

The member, in which the ferromagnetic regions and the non-magnetic regions coexist, is composed of at least two components each of which has the ferromagnetic regions and the non-magnetic regions, the components being combined together to form the rotor yoke.

The permanent magnets are embedded in the components in each of which the ferromagnetic regions and the non-magnetic regions coexist.

The permanent magnets are disposed at boundaries between the components in each of which the ferromagnetic regions and the non-magnetic regions coexist.

The member comprising the ferromagnetic regions and the non-magnetic regions is composed of a first component which comprises the ferromagnetic regions and the non-magnetic regions, and a second component made of a ferromagnetic material, the both components being combined together to form the rotor yoke.

The ferromagnetic regions and the non-magnetic regions are alternately arranged circumferentially of the rotor.

According to a second aspect of the invention, there is provided a permanent magnet field-type rotating machine comprising:

an internal magnet-type rotor having a plurality of permanent magnets embedded in a rotor yoke; and a stator disposed in opposed, spaced relationship to the rotor, with an air gap formed between the rotor and the stator;

wherein the rotor yoke is composed of a member which comprises first regions having a magnetic flux density (B4000) in a magnetic field of 4000 A/m is not less than 1(T), and second regions having a relative magnetic permeability ($\mu_s$) of not more than 2, and the second regions are arranged respectively at those positions of the rotor yoke where leakage magnetic flux is liable to be generated. If the flux density (B4000) is less than 1(T), the effective magnetic flux amount, contributing to the motor efficiency, can not be sufficiently increased, and therefore it should preferably be not less than 1(T). If the relative magnetic permeability ($\mu_s$) is more than 2, the effect of suppressing the leakage magnetic fluxes in the rotor yoke is reduced, and therefore it should preferably be not more than 2.

According to a third aspect of the invention, there is provided a permanent magnet field-type rotating machine comprising:

an internal magnet-type rotor having a plurality of permanent magnets embedded in a rotor yoke; and a stator disposed in opposed, spaced relationship to the rotor, with an air gap formed between the rotor and the stator;

wherein the rotor yoke is composed of a laminate of sheets or plates in each of which ferromagnetic regions and non-magnetic regions coexist, and the non-magnetic regions are disposed respectively at those positions of the rotor yoke where leakage magnetic flux is liable to be generated.

In the third aspect of the invention, preferably, the laminate of sheets or plates are of an integral construction.

According to a fourth aspect of the invention, there is provided a permanent magnet field-type rotating machine comprising:

an internal magnet-type rotor having a plurality of permanent magnets embedded in a rotor yoke; and a stator disposed in opposed, spaced relationship to the rotor, with an air gap formed between the rotor and the stator;

wherein the rotor yoke is composed of a member in which ferromagnetic regions and non-magnetic regions coexist, and the non-magnetic regions are disposed respectively at those positions of the rotor yoke where leakage magnetic flux is liable to be generated, and a minimum distance of the air gap is not more than 0.5 mm.

According to a fifth aspect of the invention, there is provided a permanent magnet field-type rotating machine comprising:

an internal magnet-type rotor having a plurality of permanent magnets embedded in a rotor yoke; and a stator disposed in opposed, spaced relationship to the rotor, with an air gap formed between the rotor and the stator;

wherein the rotor yoke is composed of a member in which ferromagnetic regions and non-magnetic regions coexist; the member is formed of a single material comprising different crystal structures which correspond to the ferromagnetic regions and the non-magnetic regions, respectively; the non-magnetic regions are disposed respectively at those positions of the rotor yoke where leakage magnetic flux is liable to be generated; and the permanent magnets have an arc-shaped and are arranged on a circle concentric with the rotor circumferentially spaced at predetermined intervals.

According to a sixth aspect of the invention, there is provided a permanent magnet field-type rotating machine comprising:

an internal magnet-type rotor having a plurality of permanent magnets embedded in a rotor yoke; and a stator disposed in opposed, spaced relationship to the rotor, with an air gap formed between the rotor and the stator;

wherein the rotor yoke is composed of a member in which ferromagnetic regions and non-magnetic regions coexist; the member is formed of a single material comprising different crystal structures which correspond to the ferromagnetic regions and the non-magnetic regions, respectively; the non-magnetic regions are disposed respectively at those positions of the rotor yoke where leakage magnetic flux is liable to be generated; the permanent magnets have a rectangular shape as a whole, and are arranged such that a direction of magnetization of each permanent magnet is oblique at an angle (θ) of greater than zero to less than 90 degrees with respect to a radial direction of the rotor; and the same polarity magnetic poles of any two adjacent the permanent magnets, which cooperate with each other to form one of the magnetic poles of the rotor, are arranged side by side near the outer periphery of the rotor.

According to a seventh aspect of the invention, there is provided permanent magnet field-type rotating machine comprising:

an internal magnet-type rotor having a plurality of permanent magnets embedded in a rotor yoke; and a stator disposed in opposed, spaced relationship to the rotor, with an air gap formed between the rotor and the stator;

wherein the rotor yoke is composed of a member in which ferromagnetic regions and non-magnetic regions coexist; the member is formed of a single material comprising different crystal structures which correspond to the ferromagnetic regions and the non-magnetic regions, respectively; the non-magnetic regions are disposed respectively at those positions of the rotor yoke where leakage magnetic flux is liable to be generated; and the permanent magnets have a rectangular shape as a whole, and are arranged such that a centerline of each permanent magnet parallel to a direction of magnetization of the permanent magnet is in alignment with a radial direction of the rotor.

According to a eighth aspect of the invention, there is provided a permanent magnet field-type rotating machine comprising:

an internal magnet-type rotor having a plurality of permanent magnets embedded in a rotor yoke; and a stator disposed in opposed, spaced relationship to the rotor, with an air gap formed between the rotor and the stator;

wherein the rotor yoke is composed of a member in which ferromagnetic regions and non-magnetic regions coexist; the member is formed of a single material comprising different crystal stractures which correspond to said ferromagnetic regions and the non-magnetic regions, respectively; the non-magnetic regions are disposed respectively at those positions of the rotor yoke where leakage magnetic flux is liable to be generated; and the permanent magnets have a Quonset hut shape and are arranged such that a centerline of each permanent magnet parrallel to a direction of magnetization of the permanent magnet is in alignment with a radial direction of the rotor.

In the present invention, the plurality of permanent magnets are embedded in the rotor yoke to provide the internal magnet-type rotor which achieves advantages that the dimensional tolerances are reduced with respect to rotation deflection of the rotor axis (that is, the amount of eccentricity of the rotor can be kept to a minimum, thereby maintaining the minimum distance of the air gap). Further, the rotor yoke comprises the member in which ferromagnetic regions and non-magnetic regions coexist (Preferably, this member is formed of the same material in which the ferromagnetic regions and the non-magnetic regions are different from each other in crystal structure, and more preferably the member is of an integral construction). Further, the magnetic pole portions of the rotor yoke are constituted by the ferromagnetic regions whereas the non-magnetic regions are disposed at those portions of the rotor yoke which leakage magnetic fluxes would be generated, so that only the effective magnetic flux amount, contributing to the motor efficiency and the generator efficiency, can be increased. With this construction, there is no need to provide leakage magnetic flux-reducing means, used in the conventional internal magnet-type rotor, in which only leakage magnetic flux-producing portions of a rotor yoke are reduced in thickness in order to increase a magnetic resistance. Therefore, the motor and the generator (rotating machine) of the invention can be more freely designed than conventional motors and generators having a surface magnet-type rotor or an internal magnet-type rotor. Therefore, there can be provided the permanent magnet field-type rotating machine of a high efficiency having the internal magnet-type rotor which is simple in construction, can be easily assembled, and has a high durability, and has such a magnetic circuit construction in which a leakage flux is very few.

BRIEF DESCRIPTION OF THE DRAWINGS

FIG. 12 is a diagram showing a magnetic decreasing curve of a non-magnetic region of the rotor yoke of the rotor used in the motor of the invention;

DESCRIPTION OF THE PREFERRED EMBODIMENTS

A preferred embodiment of the present invention will now be described with reference to the drawings.

Figure 1:
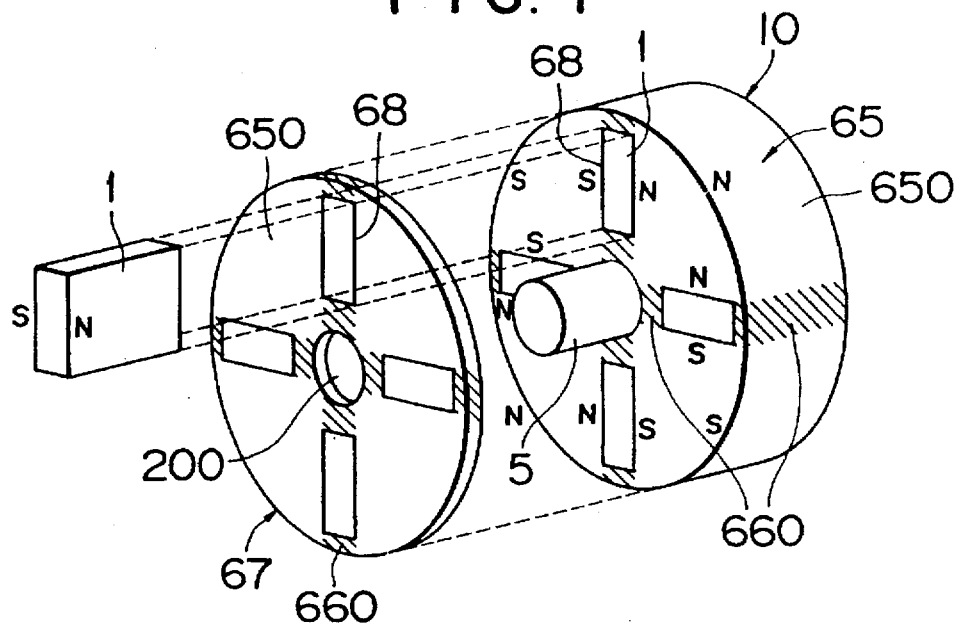
FIG. 1 is a perspective view of one preferred embodiment of a rotor of the present invention.
Figure 2:
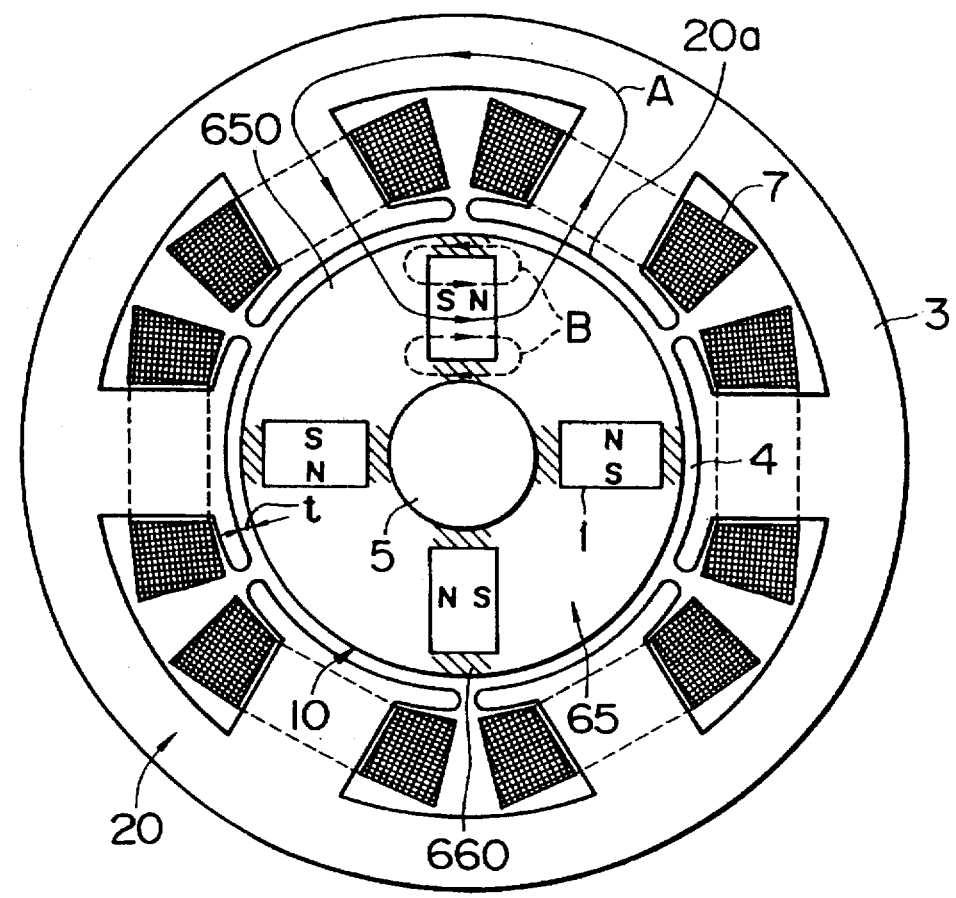
FIG. 2 is a cross-sectional view of an essential portion of a preferred embodiment of a motor of the invention.
Figure 13:
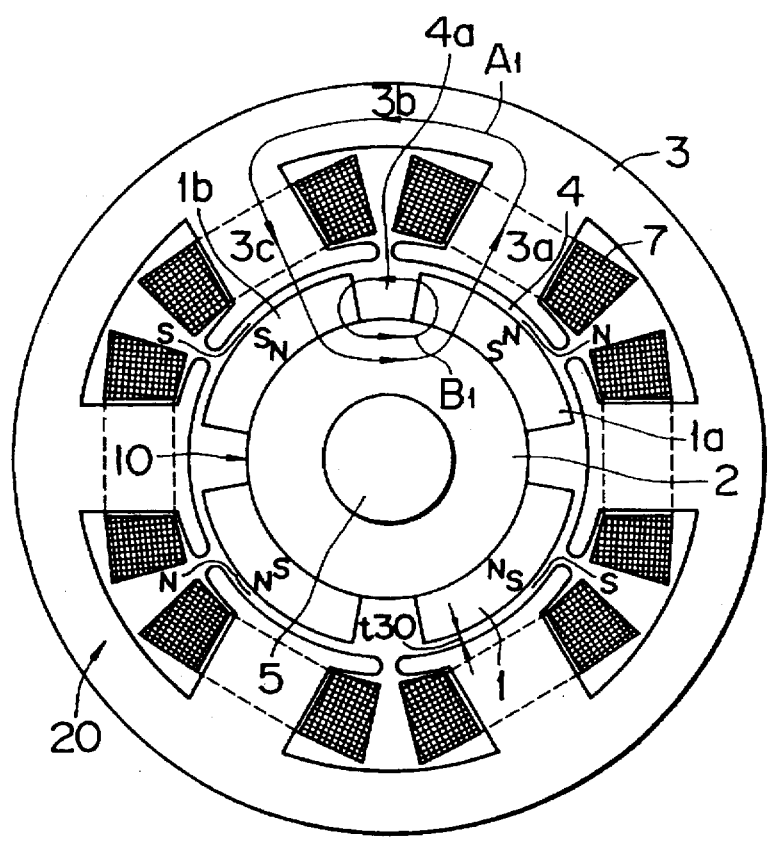
FIG. 13 a cross-sectional view of an essential portion of a conventional rotating machine having a surface magnet-type rotor.
Figure 15:
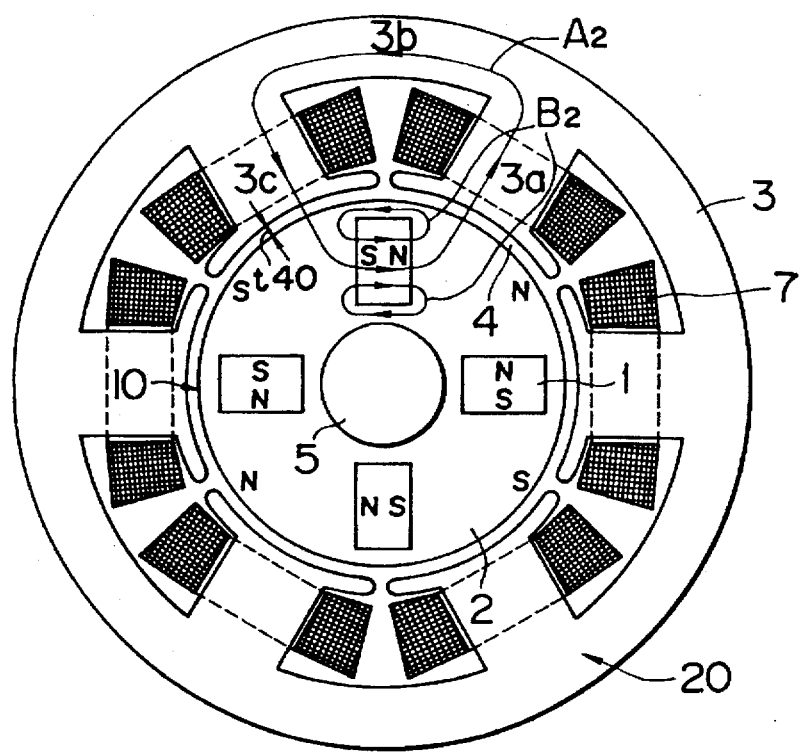
FIG. 15 is a cross-sectional view of an essential portion of a conventional rotating machine having a internal magnet-type rotor.
Figure 16:
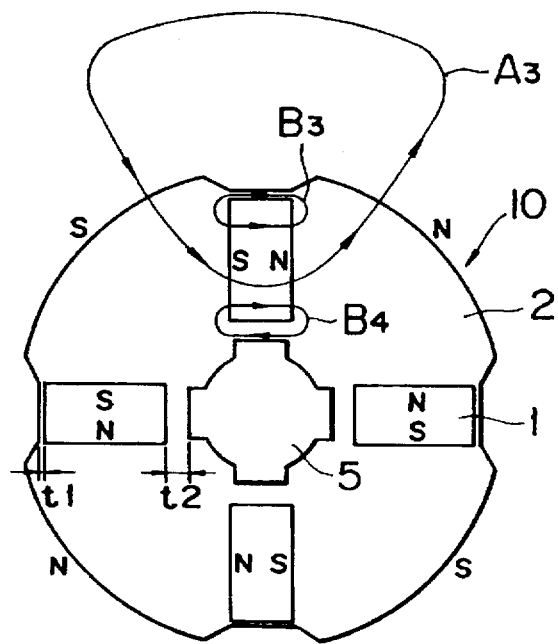
FIG. 16 is a cross-sectional view of an essential portion of a conventional internal magnet-type rotor in which those portions of a rotor yoke which cause a magnetic short-circuiting between magnetic poles of permanent magnets are reduced in thickness.

FIG. 1 is a perspective view of a rotor 10 used in a preferred embodiment of a permanent magnet field-type motor of the present invention. In FIG. 1, a rotor yoke 65 comprises a plurality of thin sheets or plates 67 laminated together, and those regions 660 indicated by hatching are non-magnetic regions of the rotor yoke 65, and those regions 650 of the rotor yoke 65 are ferromagnetic regions. Thus, the rotor yoke 65 are formed by the members (sheet 67) in which the non-magnetic regions 660 and the ferromagnetic regions 650 coexist. North magnetic poles N and south magnetic poles S are alternately formed respectively on the ferromagnetic regions 650 at an outer peripheral portion of the rotor 10. Four through holes 68 for embedding permanent magnets 1 in the rotor yoke 65 are formed through the rotor yoke 65 (that is, the thin sheets 67). The permanent magnets 1 are inserted into the through holes 68, respectively, and are firmly fixed in the rotor yoke 65, for example, by an epoxy resin adhesive. Each of the permanent magnets 1 has a north magnetic pole N and a south magnetic pole S arranged in a pattern shown in FIG. 1. The four magnetic poles (that is, the two north poles N and the two south poles S) are formed on the outer peripheral surface of the rotor 10. FIG. 2 is a cross-sectional view of an essential portion of the motor employing the rotor 10 of FIG. 1. In FIG. 2 and FIG. 13, identical reference numerals denote identical parts, respectively. In FIG. 2, since the regions 660 indicated by hatching are the non-magnetic regions, the short-circuiting of magnetic fluxes in the rotor yoke as shown in FIGS. 13, 15 and 16 will not occur, and therefore leakage magnetic flux are very few. For convenience' sake, leakage magnetic flux B, which would be produced without the regions 660, are indicated by broken lines. Therefore, the regions 660 can be formed at any desired regions of the rotor yoke 65 which can interrupt the magnetic paths of the leakage magnetic flux B indicated by the broken lines.

An outer diameter of the rotor yoke 65 of the rotor 10 is 74 mm, and a diameter of a central hole 200 for passing a rotating shaft 5 therethrough is 30 mm, and the through hole 68 for inserting the permanent magnet 1 in the rotor yoke 65 has a thickness of 3.5 mm (in the magnetized direction), a width of 16 mm and a length of 23 mm (in the direction of the length of the shaft 5). The dimension of the rotor yoke 65 in the direction of the length of the shaft is also 23 mm. The thickness between the through hole 68 and the outer peripheral surface of the rotor yoke 65 (that is, the thickness of a minimum thickness portion) is 3 mm, and the thickness between the through hole 68 and the central hole 200 (that is, the thickness of a minimum thickness portion) is 3 mm. The thickness of the thin sheet 67 is 0.45 mm. A minimum distance (t) of an air gap 4 between a stator 20 and the rotor 10 which constitute the motor of the invention is 0.3 mm. With this minimum thickness of 0.3 mm, there have been obtained good dimensional accuracies (The amount of rotation deflection at the outer periphery of the rotor 10 (FIG. 2) is not more than 0.05 mm, and the amount of perpendicularity deflection at an inner periphery 20a of the stator 20 (FIG. 2) is not more than 0.05 mm), so that the amount of eccentricity during the rotation of the rotor 10 has been kept to a minimum.

In this embodiment shown in FIGS. 1 and 2, an anisotropic sintered magnet of a Nd—Fe—B alloy (HS-32BV manufactured by Hitachi Metal Corporation) having a residual flux density Br (=1.15 tesla (T)) was used as the permanent magnet. Ferritic stainless steel (consisting, by weight, of 0.6% C, 13% Cr, and the balance Fe and incidental impurities) was used as a material for the rotor yoke 65.

The rotor 10 of this embodiment was prepared by the following process:

First, the material of the above composition for the rotor yoke 65 was worked into a sheet material having a thickness of about 1 mm, and subsequently the sheet material was subjected to stress-relieving annealing at 500° C., to provide the sheet material with a ferromagnetic crystal structure having a ferrite phase and a carbide phase. The obtained sheet material was finished by machining (blanking, cutting, grinding and so on) into the size and shape of the thin sheet 67, the thus finished sheet being composed entirely of a ferromagnetic region 650. Next, a laser beam was applied to those portions of the thin sheet 67, which correspond to the non-magnetic regions 660, to heat them up to a temperature of about 1,200° C., or to heat them up to a temperature over the melting point of the rotor yoke 65 and subsequently solidified them (In this case, although a $CO_2$ laser was used, any other suitable known lasers may be used.). After such heating or remelting/solidifying, the sheet was rapidly cooled in water, or optionally in the atmosphere or in inert gas, so that the relevent portions changed to have austenitic structure which is a non-magnetic crystal structure.

It is noted that the non-magnetic regions 660 can be consisted of the above structure of remelting/solidifying and/or cooling after heating, and that the above structure obtained by remelting/solidifying is preferable of having a relative magnetic permeability ($\mu_r$) of not more than 2 at a lower temperature level of about −40° C.

Thus, there was prepared the thin sheet 67 of an integral construction in which the ferromagnetic regions and the non-magnetic regions coexisted. The thin sheets 67 thus prepared were laminated together to form the rotor yoke 65 for the motor rotor of the present invention shown in FIGS. 1 and 2. Thereafter, the rotor 10 was produced as described above.

In the present invention, the term "rotor yoke of an integral construction" is meant to include the type. of rotor yoke (for example, one shown in FIG. 1) formed by laminating thin sheets together in order to reduce an eddy current loss developing in the rotor yoke portion.

Table 1 shows results magnetic field analysis of the motor of the invention shown in FIG. 2 and a comparative motor which is the same in construction as the motor of FIG. 2 except that its rotor yoke was formed of SS41 which is a ferromagnetic material. More specifically, these results indicate the total magnetic flux amount of an air gap portion per magnetic pole, and the amount of leakage magnetic flux passing through the rotor yoke.

TABLE 1

|  | Invention Example | Comparative Example |
| --- | --- | --- |
| Total magnetic flux amount of air gap portion per magnetic pole | 760 μWb | 300 μWb |
| Amount of leakage magnetic flux passing through rotor yoke | 60 μWb | 560 μWb |

As is clear from Table 1, the total magnetic flux amount of the air gap portion per magnetic pole in the motor of the invention is more than twice larger than that in the comparative motor. It will also be appreciated that the amount of the leakage magnetic flux passing through the rotor yoke in the motor of the invention is less than 10% of the total magnetic flux amount, and is much lower than that of the comparative motor.

In the motor of the invention, the excellent dimensional accuracies (The amount of rotation deflection at the outer periphery of the rotor was not more than 0.05 mm, and the amount of perpendicularity deflection at the inner periphery of the stator was not more than 0.05 mm) were achieved, and therefore even when the motor was driven under a severe condition in which the minimum distance of the air gap was 0.3 mm as described above, any trouble did not occur, and motor characteristics shown in Table 1 could be maintained.

Figure 14:
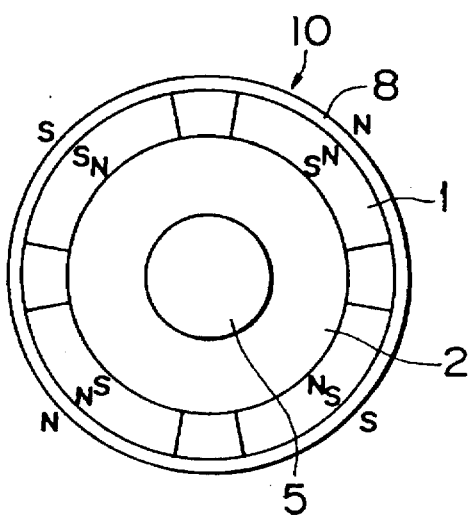
FIG. 14 is a cross-sectional view of an essential portion of a conventional surface magnet-type rotor having a rotor can mounted thereon.

In a motor with a conventional surface magnet-type rotor and a motor with a conventional can-type rotor (as shown in FIG. 14), the dimensional accuracies at the outer periphery of the rotor are limited by the dimensional accuracy of working of the permanent magnets and the dimensional accuracy of the adhesive bonding as described above, and it has been difficult to keep the rotation deflection at the outer periphery of the rotor to a level of not more than 0.1 mm. Furthermore, the stator yoke facing the rotor through the air gap is usually formed by laminating silicon steel sheets together, and satisfactory dimensional accuracies (e.g. perpendicularity deflection and eccentricity) at the yoke could not be obtained.

Therefore, taking into consideration the eccentricity amount of about 0.4 mm at the rotor and the eccentricity amount of about 0.4 mm at the stator (Such eccentricity is due to the dimensional irregularities), it is common practice in the conventional motors to provide the air gap with a distance of about 1 mm between the stator and the rotor.

On the other hand, in the present invention, the dimensional accuracies at the outer periphery of the rotor can be improved as described above, and the distance of the air gap can be reduced to not more than 0.5 mm even in a mass-production, and therefore as compared with the conventional motors, the resistance of the magnetic circuit can be reduced greatly, that is, by an amount corresponding to the reduction of the distance of the air gap. As a result, the total flux amount can be markedly increased with the same volume and weight of the permanent magnets, so that the efficiency of the motor can be enhanced.

In the above embodiment, in order to suppress the eddy current loss, the rotor yoke 65 is made of the above-mentioned material, and the rotor yoke 65 is formed by the laminated thin sheets 67. However, instead of using such thin sheets of the above material, there can be used a method in which a solid material, having a ferromagnetic crystal structure (having a ferrite phase and a carbide phase) is machined into the shape and size of the rotor yoke 65, and then only leakage magnetic flux-producing portions as described above are heated or heated/remelted, for example, by the above laser means to a temperature of about 1,200° C., or to a temperature over the melting point of the solid material, and subsequently cooled, thereby providing a rotor yoke with an integral construction (which constitutes the motor rotor of the invention) in which the ferromagnetic crystal structure and the non-magnetic crystal structure coexist.

In the rotor yoke constituting the rotor of the invention, the locally heating means or locally heating/remelting means for transforming the magnetic leakage flux-producing regions from the ferromagnetic crystal structure to the non-magnetic crystal structure is not limited to the above laser means, and instead there may be used a method in which only those regions to be made non-magnetic are heated by high-frequency induction heating, or a method in which only those regions to be made non-magnetic are heated by contact of a heated iron or the like of a predetermined shape therewith.

In the above embodiment, the ferritic stainless steel is used as the material for the rotor yoke 65. By doing so, the flux A, produced by the permanent magnet 1 (FIG. 2) of a high performance having the residual flux density Br (=1.15 T), passes sequentially through the ferromagnetic region 650 of the rotor yoke 65 and the air gap 4 to reach the rotor yoke 65 without being subjected to magnetic saturation (that is, without decreasing as far as possible the amount of the flux produced by the permanent magnet 1), so that the amount of the effective magnetic flux A interlinking the windings 7 can be secured. Namely, with this construction, there can be provided the motor of the invention in which the total flux amount of the air gap portion per magnetic pole shown in Table 1 is very large.

Figure 11:
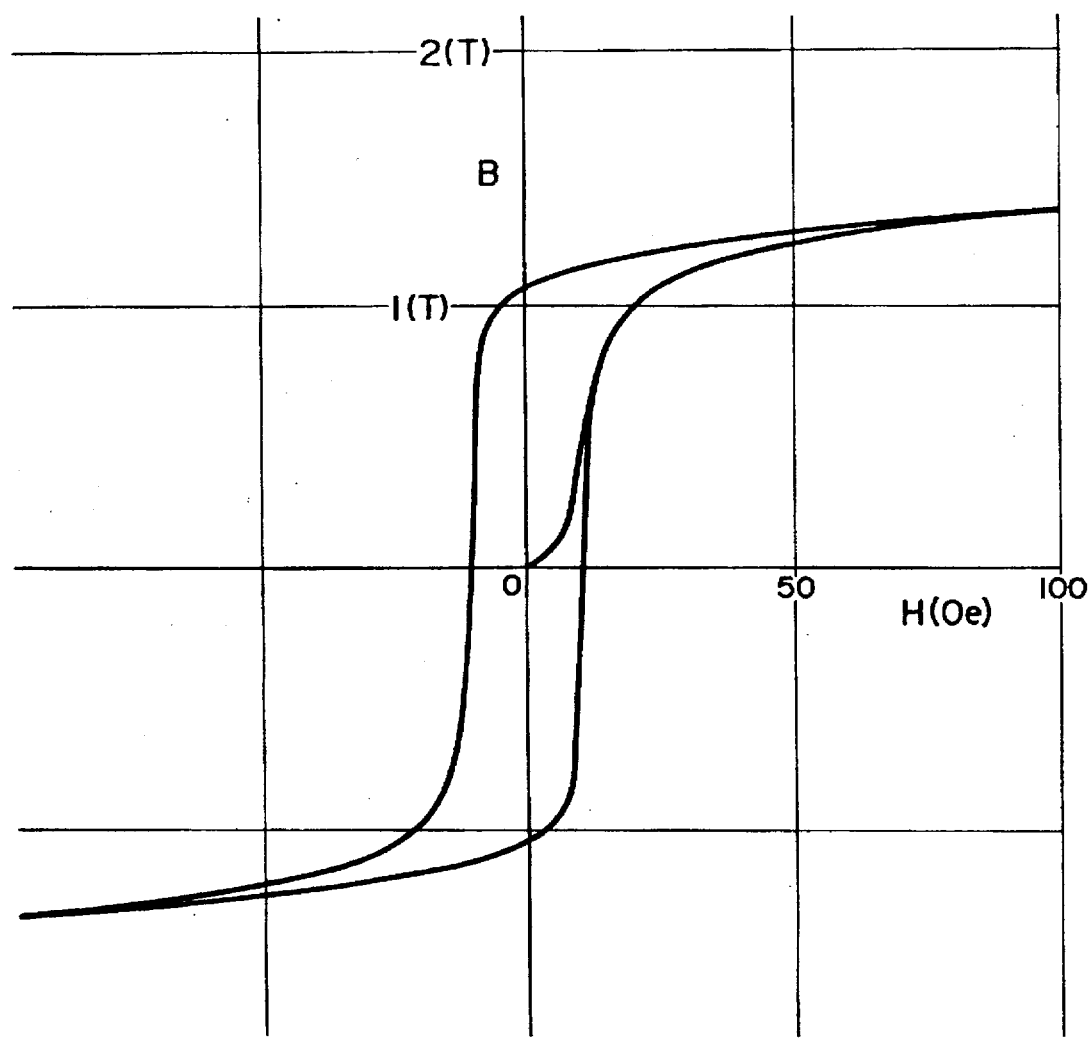
FIG. 11 is a diagram showing a magnetic decreasing curve of a ferromagnetic region of the rotor yoke of the rotor used in the motor of the invention.

FIG. 11 shows a magnetic decreasing curve of the ferromagnetic crystal structure region 650 of the rotor yoke 65 (made of the above-mentioned ferritic stainless steel) constituting the motor rotor of the invention shown in FIG. 2. This magnetic decreasing curve represents measured values at room temperature (20° C.). As can be seen from FIG. 11, the ferromagnetic region 650, when placed in a magnetic field of 4,000 (A/m) (which corresponds to about 50(Oe) in terms of a cgs unit system), exhibited excellent ferromagnetic properties, that is, a flux density B4000 (=1.2 (T)) and a coercive force Hc (=1200 (A/m). These properties are good soft magnetic properties generally corresponding to the magnetic properties (Br =1.15 (T)) of the permanent magnet of FIG. 1.

FIG. 12 shows a magnetic decreasing curve of the non-magnetic crystal structure region 660 of the rotor yoke 65 (made of the above-mentioned ferritic stainless steel) constituting the motor rotor of the invention shown in FIG. 2. This magnetic decreasing curve represents measured values at room temperature (20° C.). As can be seen from FIG. 12, the non-magnetic crystal structure region 660 exhibited excellent non-magnetic properties, that is, a relative magnetic permeability of $\mu_s \leq 2$.

The rotor yoke of the invention can be made of the same conventional material in which ferromagnetic regions and non-magnetic regions coexist, and the ferromagnetic regions and the non-magnetic regions are different from each other in crystal structure.

For example, in one method, only those portions of a ferromagnetic mother phase of a ferrite structure or the like to be made non-magnetic are heated and fused, and known austenite-forming elements are added to the fused portions, and then the fused portions are cooled to be solidified, thereby making the localized (fused and solidified) portions non-magnetic. In another method, only those portions of a non-magnetic mother phase of an austenitic structure to be made ferromagnetic are heated and fused, and known ferrite-forming elements are added to the fused portions, and then the fused portions are cooled to be solidified, thereby making the localized (fused and solidified) portions ferromagnetic.

Also, using, for example, austenitic stainless steel of a Fe—Cr—Ni alloy (containing 70–74 wt. % Fe, 18–20 wt. % Cr, 8–10 wt. % Ni, and incidental impurities), the rotor yoke for the motor rotor of the invention can be formed of the same material (preferably of an integral construction) in which a ferromagnetic crystal structure and a non-magnetic crystal structure coexist, as described in the above method.

With respect to this austenitic stainless steel, one method of causing the ferromagnetic crystal structure and the non-magnetic crystal structure to coexist in the same material is as follows:

First, this material, which is non-magnetic in its original condition, is formed by cold rolling or the like into a thin sheet, so that the whole of the material is transformed into a work inducing martensitic phase exhibiting a ferromagnetic nature. Then, the thin sheet is subjected to stress-relieving annealing at a temperature of 480° C. Then, the thin sheet is machined into the shape of the thin sheet 67 shown in FIG. 1. Then, those portions of the thin sheet, corresponding respectively to the non-magnetic regions 660, are heated or heated/remelted by the above laser means to above the temperature of transformation from martensite austenite, and subsequently the heated or heated/remelted portions are cooled, so that the non-magnetic regions 660 are formed by the non-magnetic austenitic phase. However, in the case of this austenitic stainless steel, the ferromagnetic crystal structure has a coercive force Hc=2400 (A/m) which is about twice higher than the coercive force Hc of the ferromagnetic regions 650 of the ferritic stainless steel used to form the rotor yoke 65 of FIG. 2, and therefore this ferromagnetic crystal structure is somewhat inferior in soft magnetic properties. And besides, in order to transform the material into the ferromagnetic crystal structure, it is necessary to effect the cold working such as cold rolling. Despite these, the rotor yoke, formed by this method, can be used to form the motor rotor of the invention.

Although the direction of magnetization of the permanent magnets 1 (In FIG. 1, the magnetic anisotropic direction of the permanent magnets 1 coincides with the direction of magnetization) of the rotor incorporated in the motor of the invention is perpendicular to the radial direction of the rotor 10 as shown in FIG. 1, the invention is not limited to this arrangement.

Figure 3:
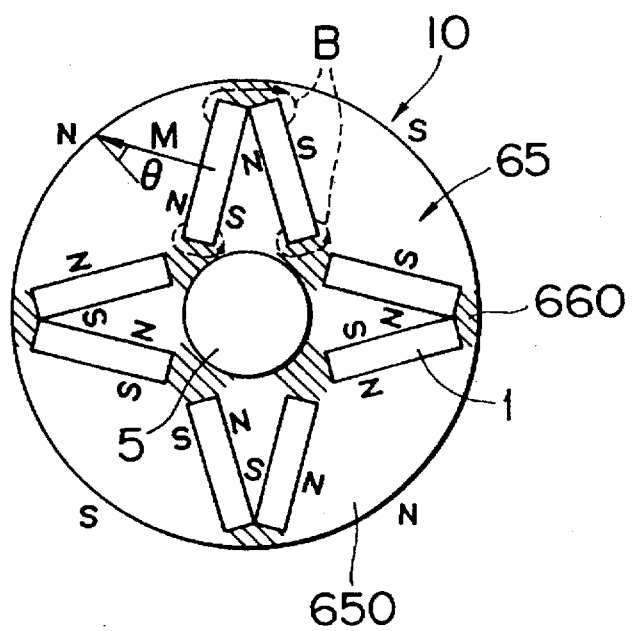
FIG. 3 is a cross-sectional view of an essential portion of a modified rotor of the invention in which a direction of magnetization of permanent magnets is disposed at an angle with respect to a radial direction of the rotor.

FIG. 3 shows a modified rotor used in the motor of the invention. In this embodiment, permanent magnets 1 are so arranged that a direction M of magnetization of each permanent magnet 1 is inclined at an angle of θ (0<θ<90°) with respect to a radial direction of the rotor 10. With this arrangement, two permanent magnets 1 are provided for each magnetic pole formed at an outer periphery of the rotor 10, and the same polarity magnetic poles of any two adjacent permanent magnets 1, which cooperate with each other to form one of the magnetic poles of the rotor 10, are generally opposed to each other. With this arrangement, there is achieved an advantage that by changing the angle 8, the effective flux amount per magnetic pole can be freely varied. In this embodiment of FIG. 3, ferromagnetic regions 650 and non-magnetic regions 660 are formed in a rotor yoke 65 as described above for the rotor yoke of FIG. 1. For convenience' sake, leakage magnetic fluxes B, which would be produced without the non-magnetic regions 660, are indicated by broken lines in FIG. 3.

Figure 4:
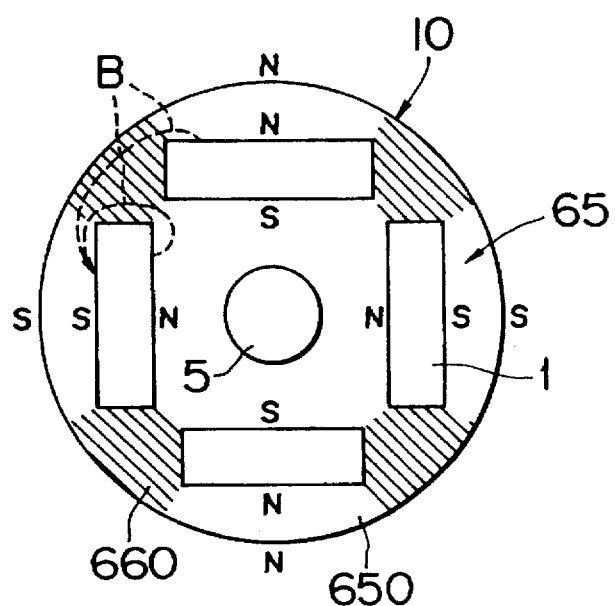
FIG. 4 is a cross-sectional view of an essential portion of another modified rotor of the invention in which a centerline of each permanent magnet parallel to a direction of magnetization of the permanent magnet of a rectangular cross-section is disposed in a radial direction of the rotor.

FIG. 4 is a cross-sectional view of an essential portion of another modified rotor used in the motor of the invention. In this embodiment, a centerline (passing across each permanent magnet 1 midway between opposite ends thereof) parallel to a direction of magnetization of the permanent magnet 1 is disposed in a radial direction of the rotor 10.

In this embodiment, although the permanent magnets 1 are provided in a rotor yoke 65, thus forming the rotor 10 of an internal magnet-type magnetic circuit construction, this rotor can achieve the effective magnetic flux amount close to that obtained with a rotor of a surface magnet-type magnetic circuit construction. In this embodiment of FIG. 4, ferromagnetic regions 650 and non-magnetic regions 660 are formed in the rotor yoke 65 as described above for the rotor yoke of FIG. 1. For convenience' sake, leakage magnetic flux B, which would be produced without the non-magnetic regions 660, are indicated by broken lines in FIG. 4.

Figure 5:
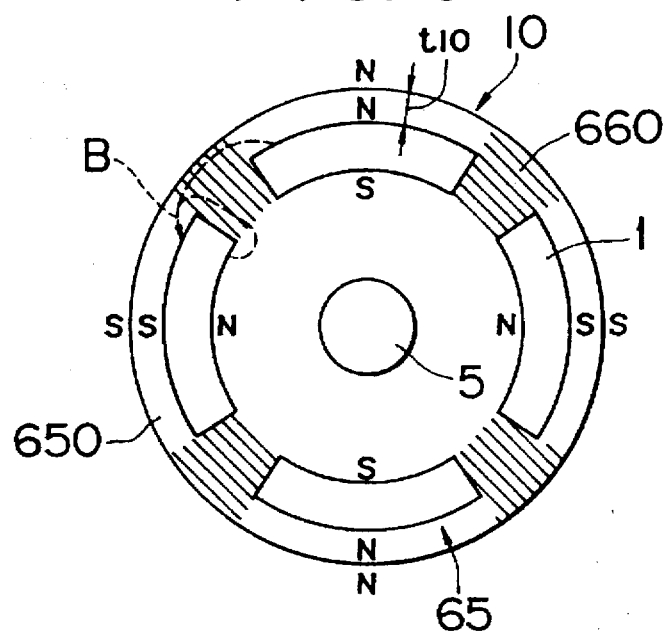
FIG. 5 is a cross-sectional view of an essential portion of a further modified rotor of the invention in which a direction of magnetization of each permanent magnet of an arc-shaped cross-section is disposed in a radial direction, and permanent magnets are arranged on a circle concentric with a rotor yoke.

FIG. 5 is a cross-sectional view of an essential portion of a further modified rotor used in the motor of the invention.

In this embodiment, each of permanent magnets 1 has an arc-shaped cross-section, and the permanent magnets 1 are arranged on a circle concentric with a rotor yoke 65, and are circumferentially spaced at predetermined intervals. In this embodiment, the permanent magnets 1 is more complicated in shape than the permanent magnets of FIG. 4, and therefore the workability of the permanent magnet is inferior. However, a thickness $t_{10}$ of that portion of the rotor yoke 65 lying between each permanent magnet 1 and an air gap is constant or uniform at a magnetic pole region formed at the outer periphery of the rotor 10, and therefore this rotor can achieve the effective magnetic flux amount closer to that obtained with an rotor of a surface magnet-type magnetic circuit construction as compared with the rotor of FIG. 4. In this embodiment of FIG. 5, ferromagnetic regions 650 and non-magnetic regions 660 are formed in the rotor yoke 65 as described above for the rotor yoke of FIG. 1. For convenience' sake, leakage magnetic flux B, which would be produced without the non-magnetic regions 660, are indicated by broken lines in FIG. 5.

Figure 6:
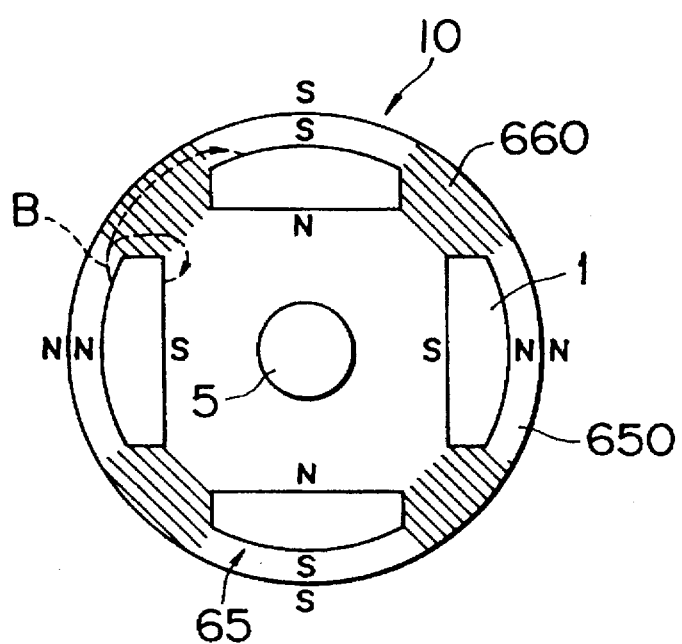
FIG. 6 is a cross-sectional view of an essential portion of a further modified rotor of the invention in which a centerline of each permanent magnet parallel to a direction of magnetization of the permanent magnet of a crescent-like cross-section is disposed in a radial direction of the rotor.

FIG. 6 is a cross-sectional view of an essential portion of a still further modified rotor used in the motor of the invention. In this embodiment, each of permanent magnets 1 has a generally crescent-shaped cross-section, and a central portion of the permanent magnet 1 is much thicker than opposite end portions thereof. Therefore, when the motor, having this rotor 10 incorporated therein, is driven, there is achieved an advantage that an effective magnetic flux density distribution in a direction of rotation of the rotor 10 in an air gap is made close to a sinusoidal wave. In this embodiment of FIG. 6, ferromagnetic regions 650 and non-magnetic regions 660 are formed in a rotor yoke 65 as described above for the rotor yoke of FIG. 1. For convenience' sake, leakage magnetic flux B, which would be produced without the non-magnetic regions 660, are indicated by broken lines in FIG. 6.

In FIGS. 3 to 6, the same reference numerals as those of FIG. 1 denote the identical constituent parts, respectively, and it is preferred that the direction of magnetization of the permanent magnets should coincide with the magnetic anisotropic direction in order to achieve the large effective magnetic flux amount in the motor. In each of these embodiments, the leakage magnetic flux B can be suppressed, and the motor is highly reliable in mechanical strength and durability. By replacing the rotor 10 of FIG. 2 with any one of the rotors of FIGS. 3 to 6, the motor of the present invention can be constructed.

In the embodiments of FIGS. 1 to 6, although the rotor yokes 65 have the integral construction (including the laminate of sheet members), a split-type rotor yoke may be used depending on the condition of use of the motor, the assembling cost, the design conditions, and so on.

Figure 7:
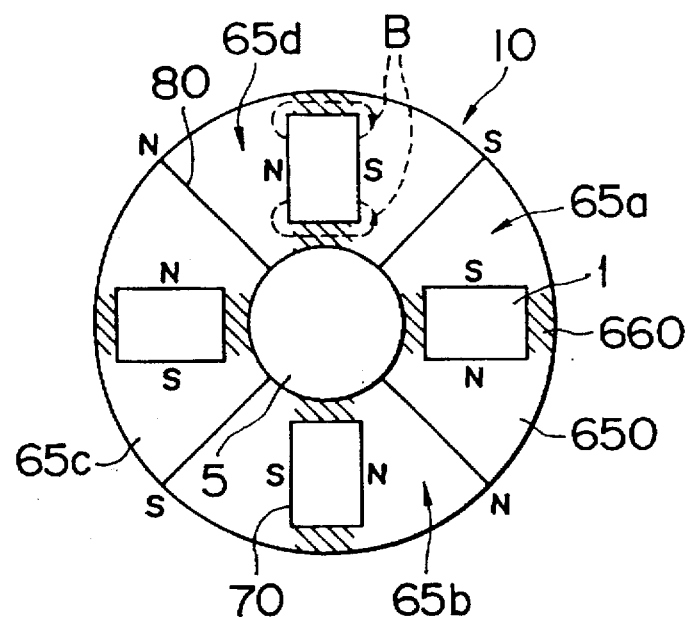
FIG. 7 is a cross-sectional view of an essential portion of a further modified rotor having a rotor yoke comprising a plurality of members.

FIG. 7 is a cross-sectional view of an essential portion of a further modified rotor 10 used in the motor of the invention which rotor is constituted by a split-type rotor yoke comprising rotor yoke members (hereinafter referred to as "split rotor yoke members") 65a to 65d.

In FIG. 7, permanent magnets 1 are mounted in the rotor yoke members 65a to 65d of the split-type rotor yoke, respectively, and these split rotor yoke members 65a to 65d are assembled together, and are mechanically fixedly connected together at boundaries 80. Ferromagnetic regions 650 and non-magnetic regions 660 coexist in each of the split rotor yoke members 65a to 65d. In this embodiment, since the permanent magnets 1 are mounted respectively in the plurality of split rotor yoke members 65a to 65d, external stresses are less liable to act on the permanent magnets 1, and therefore there can be provided the rotor which is quite mechanically rigid or sturdy.

In this embodiment of FIG. 7, the ferromagnetic regions 650 and the non-magnetic regions 660 are formed in each of the split rotor yoke members 65a to 65d as described above for the rotor yoke of FIG. 1. For convenience' sake, leakage magnetic flux B, which would be produced without the non-magnetic portions 660, are indicated by broken lines in FIG. 7.

Figure 8:
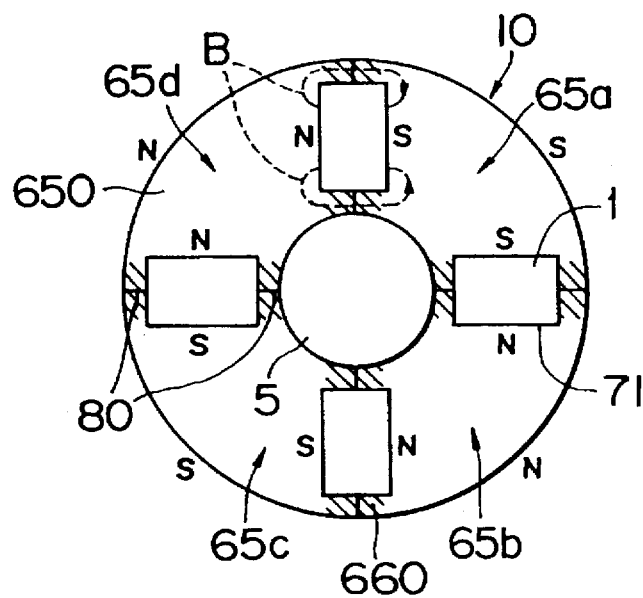
FIG. 8 is a cross-sectional view of an essential portion of a further modified rotor having a rotor yoke comprising a plurality of members.

FIG. 8 is a cross-sectional view of an essential portion of a further modified rotor 10 used in the motor of the invention which rotor is constituted by split rotor yoke members 65a to 65d.

In this embodiment of FIG. 8, a ferromagnetic region 650 and non-magnetic regions 660 coexist in each of the split rotor yoke members 65a to 65d, and recesses. 71 are formed respectively in boundary portions 80 of the rotor yoke members 65a to 65d at which they are joined together. Permanent magnets 1 are mounted in the recesses 71, respectively.

In this embodiment, the permanent magnets 1 are not inserted respectively into holes 70 formed respectively through the split rotor yoke members as in the embodiment of FIG. 7, and instead the permanent magnets 1 are first mounted respectively in the recess 71 at the boundary portion between the split rotor yoke members 65a and 65b, the recess 71 at the boundary portion between the rotor yoke members 65b and 65c, the recess 71 at the boundary portion between the rotor yoke members 65c and 65d and the recess 71 at the boundary portion between the rotor yoke members 65d and 65a. Then, the split rotor yoke members 65a to 65d are mechanically connected together to form the internal magnet-type rotor 10 of FIG. 8. Therefore, the rotor of this split construction is advantageous particularly when the rotor has an increased dimension in a direction of a length of a shaft 5. In this embodiment of FIG. 8, the ferromagnetic region 650 and the non-magnetic regions 660 are formed in each of the split rotor yoke members 65a to 65d as described above for the rotor yoke of FIG. 1. For convenience' sake, leakage magnetic flux B, which would be produced without the non-magnetic regions 660, are indicated by broken lines in FIG. 8.

Figure 9:
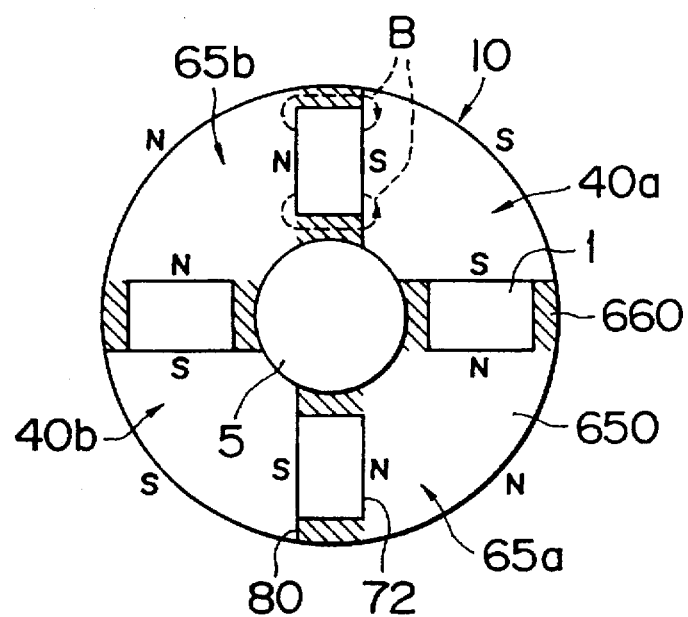
FIG. 9 is a cross-sectional view of an essential portion of a further modified rotor having a rotor yoke comprising a plurality of members.

FIG. 9 is a cross-sectional view of an essential portion of a further modified rotor 10 used in the motor of the invention, and this rotor 10 comprises split rotor yoke members 65a and 65b in each of which a ferromagnetic region 650 and non-magnetic regions 660 coexist, and split rotor yoke members 40a and 40b each composed entirely of a ferromagnetic region (SS41). In this embodiment of FIG. 9, permanent magnets 1 are mounted respectively in a recess 72 at a boundary portion between the split rotor yoke members 65a and 40b, a recess 72 at a boundary portion between the rotor yoke members 40b and 65b, a recess 72 at a boundary portion between rotor yoke members 65b and 40a and a recess 72 at a boundary portion between the rotor yoke members 40a and 65a. More specifically, each of the rotor yoke members 65a and 65b has the recesses 72 formed respectively in the opposite boundary surfaces thereof.

In this embodiment of FIG. 9, the permanent magnets 1 can be easily mounted in the rotor 10 when the rotor has an increased dimension in a direction of a length of a shaft 5, as in the embodiment of FIG. 8. Part of the split yoke members are made of an ordinary ferromagnetic yoke material (SS41) which is inexpensive, and can achieve a large effective magnetic flux amount, and therefore there can be provided the rotor 10 which is less costly, and can achieve the larger effective magnetic flux amount. For convenience' sake, leakage magnetic flux B, which would be produced without the non-magnetic regions 660, are indicated by broken lines in FIG. 9.

Figure 10:
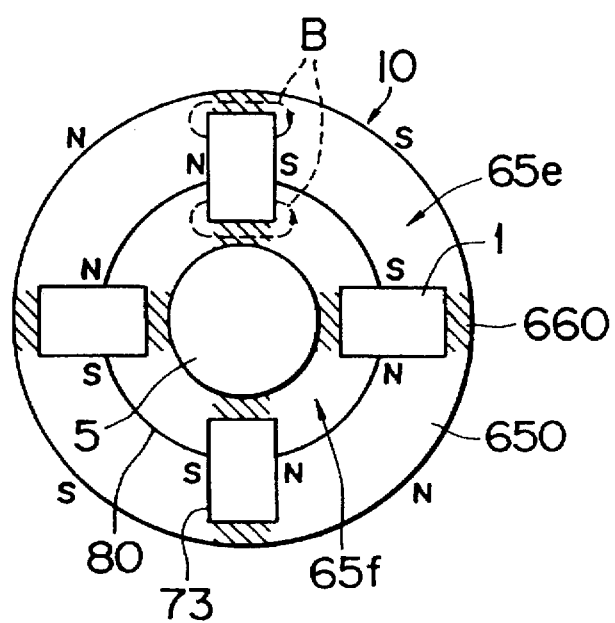
FIG. 10 is a cross-sectional view of an essential portion of a further modified rotor having a rotor yoke comprising a plurality of members separated in a radial direction.

FIG. 10 is a cross-sectional view of a further modified rotor 10 used in the motor of the invention which rotor is constituted by split rotor yoke members 65e and 65f.

The annular split rotor yoke members 65e and 65f are separated from each other radially of the rotor 10, and are disposed in concentric relation to each other. Ferromagnetic regions 650 and non-magnetic regions 660 coexist in each of the split rotor yoke members 65e and 65f. Permanent magnets 1 are mounted respectively in recesses 73 formed at a boundary portion between the split rotor yoke members 65e and 65f. The yoke members 65e and 65f are mechanically connected together to form the rotor 10 of FIG. 10.

In this embodiment, the permanent magnets 1 are mounted respectively in the recesses 73, and with this construction the rotor 10 can be easily assembled when the rotor has an increased dimension in a direction of a length of a shaft 5. And besides, since each of the split rotor yoke members 65e and 65f is continuous or integral both in the direction of the circumference of the rotor 10 and in the direction of the axis of the shaft 5, the mechanical strength of the rotor 10 is quite high, and satisfactory dimensional accuracy of working of the outer peripheral surface of the rotor 10 can be achieved, so that the amount of eccentricity of the rotor can advantageously be kept to a minimum. For convenience' sake, leakage magnetic flux B, which would be produced without the non-magnetic regions 660, are indicated by broken lines in FIG. 8.

In FIGS. 7 to 10, the same reference numerals as those of FIG. 1 denote the identical constituent parts, respectively. In each of these embodiments, the leakage magnetic flux B can be suppressed, and the motor is highly reliable in mechanical strength and durability.

In FIGS. 7 to 10, the split rotor yoke members can be mechanically connected together to form the rotor of the invention by a method in which through holes are formed respectively through the split rotor yoke members in the direction of the length of the rotor shaft, and bolts are passed respectively through these through holes and holder plates held respectively against opposite ends of the rotor, and then the bolts are tightened by nuts, respectively, thereby mechanically fixedly c onnecting the split rotor yoke members together with the permanent magnets. Also, the split rotor yoke members can be fixedly connected together by known welding means or a known adhesive, or a method in which through holes are formed respectively through the split rotor yoke members, and then molten metal or alloy of a low melting point is filled in these through holes, and is cooled and solidified, thereby connecting the yoke members together, or a method in which a plastics material or rubber (preferably containing a filler or consisting of FRP) in the molten or fused state is filled in the above through holes through the yoke members, and then is cooled and solidified, thereby connecting the yoke members together. However, the invention is not limited to these mechanical connecting means, and any other suitable mechanical connecting means can be used.

In the present invention, as described in the embodiments of FIGS. 1 to 10, the rotor yoke, constituting the rotor of the motor of the invention, can be formed by the single member or the plurality of members, in which the ferromagnetic regions and the non-magnetic regions coexist. Also, the rotor yoke of the rotor used in the motor of the invention may be formed by combining members, in which ferromagnetic regions and non-magnetic regions coexist, with ferromagnetic members composed each entirely of a ferromagnetic region, thus providing a composite type. Alternatively, the rotor yoke of the rotor used in the motor of the invention may be formed by combining members, in which ferromagnetic regions and non-magnetic regions coexist, with non-magnetic members each composed entirely of a non-magnetic region, thus providing a composite type.

As the permanent magnets used in the present invention can be produced by conventional methods such as a powder metallurgy method, a plastic working method (swaging, extruding, rolling and so on), a bonded magnet method, a casting method, and a ultra-rapid cooling method. For forming the permanent magnets of the invention, there can be used at least one conventional permanent magnet material selected from the group consisting of a rare earth element magnet material, an Alnico magnet material, a Mn—Al magnet material and so on. Such rare earth element magnet material is composed of R—Fe—B alloy, Sm—Co alloy, or Sm—Fe—N alloy (R is at least one selected from the group consisting of rare earth elements containing Y, and there may optionally be contained at least one element effective for magnetic properties, which is selected from the group consisting of Co, Al, Nb, Ga, Fe, Cu, Zr, Ti, Hf, Ni, V, Si, Sn, Cr, Mo, Zn, Pt, Bi, Ta, W, Sb, Ge and Mn. Further, there may be contained at least one incidental impurity element selected from the group consisting of O, C, N, H, P and S). Also, the permanent magnets of the invention may be formed mainly by powder (particles) of at least one selected from the above permanent magnet materials, and a conventional thermoplastic resin, or a conventional thermosetting resin, or a conventional rubber material, namely a conventional bonded magnet (preferably, an anisotropic bonded magnet) containing the above materials is liable to use for the invention. Preferably, for oxidation-preventing purposes, an oxidation-resistant film or coating is formed on the surface of the permanent magnet of the above R—Fe—B alloy. For example, the coating is composed of at least one selected from the group consisting of Ni, Cu, Al, Zn, Cr, Ni—P, Ti, Sn, Pb, Pt, Ag and Au, and the coating can be formed by a conventional electroplating method or a conventional electroless plating method. Also, the coating can be formed using one or more of conventional coating-forming methods including vacuum deposition (by which for example, known metal or resin of high oxidation resistance is coated over the entire surface), ion sputtering, IVD, and EVD. Another alternative is the electrodeposition (electrocoating) of an epoxy resin or the like. When it is desired to impart a more excellent oxidation resistance to the permanent magnet of the above R—Fe—B alloy, it is preferred that using the above coating-forming methods in combination, for example, a Ni film (having a thickness of several µm to several tens of µm) is formed by plating on a Cu film (formed by plating and having a thickness of several µm to several tens of µm), and then an epoxy resin (having a thickness of several µm to several tens of µm) is electrodeposited on this Ni film.

Among the above permanent magnets, the anisotropic sintered magnet of the Nd—Fe—B alloy and/or the bonded magnet (preferably a anisotropic magnet) of the Nd—Fe—B are particularly preferred.

Although the above embodiments are directed to the motors, the invention can be applied to any other suitable rotating machine such as a generator.

In the motors and generators of the present invention, the number of the magnetic poles and the diameter of the rotor are not limited, and can be suitably determined in accordance with the purpose of use, and the present invention is useful particularly when the number of the magnetic poles is 4 to 100. In the above embodiments of the invention, although the magnetic poles, formed at the outer peripheral portion of the rotor, are arranged in a symmetrical pattern, they may be arranged in an asymmetrical pattern.

With the above construction and operation, the present invention can achieve the following advantageous effects:

(1) Leakage magnetic fluxes, formed between the magnetic poles of each of the permanent magnets of the internal magnet-type rotor, as well as leakage magnetic flux formed between the magnetic poles of any two adjacent permanent magnets, can be suppressed, thereby providing the rotating machine having the magnetic circuit of a high efficiency.

(2) Since the permanent magnets are embedded in the rotor yoke, mechanical stresses acting on the permanent magnets are small, and besides the degree of freedom of design of the rotor yoke parts is enhanced, thereby providing the rotating machine which is highly reliable in mechanical strength and durability.

(3) The dimensional accuracy of the outer peripheral portion of the rotor can be determined only by the dimensional accuracy of working of the rotor yoke containing the permanent magnets, and therefore the rotor with a reduced eccentricity amount can be produced, so that the distance of the air gap can be reduced. This enables the production of the rotating machine in which the effective magnetic flux amount is increased.

What is claimed is:

1. A permanent magnet field-type rotating machine comprising:

an internal magnet-type rotor having a plurality of permanent magnets embedded in a rotor yoke: and a stator disposed in opposed, spaced relationship to said rotor, with an air gap formed between said rotor and said stator:

wherein said rotor yoke is composed of a member, comprising ferromagnetic regions and non-magnetic regions coexisting and formed of a single material comprising different crystalline structures which correspond to said ferromagnetic regions and said non-magnetic regions, respectively, said non-magnetic regions being arranged at respective positions of said rotor yoke where leakage magnetic flux is liable to be generated.

2. A rotating machine according to claim 1, in which said member, comprising said ferromagnetic regions and said non-magnetic regions, has an integral structure.

3. A rotating machine according to claim 1, in which said member, comprising said ferromagnetic regions and said non-magnetic regions, is composed of at least two components each of which has the ferromagnetic regions and the non-magnetic regions, and which are combined together to form said rotor yoke.

4. A rotating machine according to claim 3, in which said permanent magnets are embedded in said respective components.

5. A rotating machine according to claim 3, in which said permanent magnets are disposed at boundaries between said components.

6. A rotating machine according to claim 1, in which said member, comprising said ferromagnetic regions and said non-magnetic regions, is composed of a first component which comprises the ferromagnetic regions and the non-magnetic regions, and a second component made of a ferromagnetic material, the both components being combined together to form said rotor yoke.

7. A rotating machine according claim 1, in which said ferromagnetic regions and said non-magnetic regions are alternately arranged circumferentially of said rotor.

8. A permanent magnet field-type rotating machine comprising:

an internal magnet-type rotor having a plurality of permanent magnets embedded in a rotor yoke; and a stator disposed in opposed, spaced relationship to said rotor, with an air gap formed between said rotor and said stator;

wherein said rotor yoke is composed of a member which comprises first regions having a magnetic flux density, (B4000) in a magnetic field of 4000 A/m, not less than 1 Tesla, and second regions having a relative permeability ($\mu$)of not more than 2, wherein said first and second regions are coexisting and formed of a single material comprising different crystalline structures which correspond to said first regions and said second regions, respectively, and said second regions are arranged at respective positions of said rotor yoke where leakage magnetic flux is liable to be generated.

9. A permanent magnet field-type rotating machine comprising:

an internal magnet-type rotor having a plurality of permanent magnets embedded in a rotor yoke; and a stator disposed in opposed, spaced relationship to said rotor, with an air gap formed between said rotor and said stator;

wherein said rotor yoke is composed of a laminate of sheets or plates in each of which ferromagnetic regions and non-magnetic regions coexist, and said non-magnetic regions are disposed respectively at those positions of said rotor yoke where leakage magnetic flux is liable to be generated.

10. A rotating machine according to claim 9, in which said laminate of sheets or plates is of an integral structure.

11. A permanent magnet field-type rotating machine comprising:

an internal magnet-type rotor having a plurality of permanent magnets embedded in a rotor yoke; and a stator disposed in opposed, spaced relationship to said rotor, with an air gap formed between said rotor and said stator;

wherein said rotor yoke is composed of a member in which ferromagnetic regions and non-magnetic regions coexist and are formed of a single material comprising different crystalline structures which correspond to said ferromagnetic regions and said non-magnetic regions, respectively, and said non-magnetic regions are disposed at respective positions of said rotor yoke where leakage magnetic flux is liable to be generated and a minimum distance of said air gap is not more than 5 mm.

12. A permanent magnet field-type rotating machine comprising:

an internal magnet-type rotor having a plurality of permanent magnets embedded in a rotor yoke; and a stator disposed in opposed, spaced relationship to said rotor, with an air gap formed between said rotor and said stator;

wherein said rotor yoke is composed of a member in which ferromagnetic regions and non-magnetic regions coexist; said member is formed of a single material comprising different crystal structures which correspond to said ferromagnetic regions and said non-magnetic regions, respectively; said non-magnetic regions are disposed respectively at those positions of said rotor yoke where leakage magnetic flux is liable to be generated, and said permanent magnets have an arc-shape and are arranged on a circle concentric with said rotor circumferentially spaced at predetermined intervals.

13. A permanent magnet field-type rotating machine comprising:

an internal magnet-type rotor having a plurality of permanent magnets embedded in a rotor yoke; and a stator disposed in opposed, spaced relationship to said rotor, with an air gap formed between said rotor and said stator;

wherein said rotor yoke is composed of a member in which ferromagnetic regions and non-magnetic regions coexist; said member is formed of a single material comprising different crystal structures which correspond to said ferromagnetic regions and said non-magnetic regions, respectively; said non-magnetic regions are disposed respectively at those positions of said rotor yoke where leakage magnetic flux is liable to be generated; said permanent magnets have a rectangular shape as a whole and are arranged such that a direction of magnetization of each permanent magnet is oblique at an angle (θ) of greater than zero to less than 90 degrees with respect to a radial direction of said rotor; and the same polarity magnetic poles of any two adjacent said permanent magnets, which cooperate with each other to form one of the magnetic poles of said rotor, are arranged side by side near the outer periphery of said rotor.

14. A permanent magnet field-type rotating machine comprising:

an internal magnet-type rotor having a plurality of permanent magnets embedded in a rotor yoke; and a stator disposed in opposed, spaced relationship to said rotor, which an air gap formed between said rotor and said stator;

wherein said rotor yoke is composed of a member in which ferromagnetic regions and non-magnetic regions coexist; said member is formed of a single material comprising different crystal structures which correspond to said ferromagnetic regions and said non-magnetic regions, respectively; said non-magnetic regions are disposed respectively at those positions of said rotor yoke where leakage magnetic flux is liable to be generated; and said permanent magnets have a rectangular shape as a whole, and are arranged such that a centerline of each permanent magnet parallel to a direction of magnetization of said permanent magnet is in alignment with a radial direction of said rotor.

15. A permanent magnet field-type rotating machine comprising:

an internal magnet-type rotor having a plurality of permanent magnets embedded in a rotor yoke; and a stator disposed in opposed, spaced relationship to said rotor, with an air gap formed between said rotor and said stator;

wherein said rotor yoke is composed of a member in which ferromagnetic regions and non-magnetic regions coexist; said member is formed of a single material comprising different crystal structures which correspond to said ferromagnetic regions and said non-magnetic, respectively; said non-magnetic regions are disposed respectively at those positions of said rotor yoke where leakage magnetic flux is liable to be generated; and said permanent magnets have a Quonset hut shape and are arranged such that a centerline of each permanent magnet parallel to a direction of magnetization of said permanent magnet is in alignment with a radial direction of said rotor.

16. A permanent magnet field-type rotating machine comprising:

an internal magnet-type rotor having a plurality of permanent magnets embedded in a rotor yoke; and a stator disposed in opposed, spaced relationship to said rotor, with an air gap formed between said rotor and said stator;

wherein said rotor yoke is composed of a member having an integral structure in which ferromagnetic regions and non-magnetic regions coexist, said non-magnetic regions being arranged at respective positions of said rotor yoke where leakage magnetic flux is liable to be generated.

17. A permanent magnet field-type rotating machine comprising:

an internal magnet-type rotor having a plurality of permanent magnets embedded in a rotor yoke; and a stator disposed in opposed, spaced relationship to said rotor, with an air gap formed between said rotor and said stator;

wherein said rotor yoke is composed of a member having at least two components each of which has ferromagnetic regions and non-magnetic regions and which are combined together to form said rotor yoke, and said non-magnetic regions are disposed at respective positions of said rotor yoke where leakage magnetic flux is liable to be generated.

18. A rotating machine according to claim 17, in which said permanent magnets are embedded in said respective components.

19. A rotating machine according to claim 17, in which said permanent magnets are embedded at boundaries between said components.

20. A permanent magnet field-type rotating machine comprising:

an internal magnet-type rotor having a plurality of permanent magnets embedded in a rotor yoke; and a stator disposed in opposed, spaced relationship to said rotor, with an air gap formed between said rotor and said stator;

wherein said rotor yoke is comprised of a member composed of a first component having ferromagnetic regions and non-magnetic regions and a second component made of a ferromagnetic material, said first and second components being combined together to form said rotor yoke, and said non-magnetic regions of said first component are disposed at respective positions of said rotor yoke where leakage magnetic flux is liable to be generated.

* * * * *